(12) United States Patent
Thorwesten, Jr.

(10) Patent No.: US 10,830,353 B2
(45) Date of Patent: Nov. 10, 2020

(54) DEVICE FOR CLOSED SYSTEMS FOR EQUALIZING PRESSURE SURGES

(71) Applicant: Thorwesten Vent GmbH, Beckum (NRW) (DE)

(72) Inventor: Albert Thorwesten, Jr., Hamm (DE)

(73) Assignee: Thorwesten Vent GmbH, Beckum (DE)

( * ) Notice: Subject to any disclaimer, the term of this patent is extended or adjusted under 35 U.S.C. 154(b) by 0 days.

(21) Appl. No.: 16/332,871

(22) PCT Filed: Aug. 2, 2017

(86) PCT No.: PCT/EP2017/069536
§ 371 (c)(1),
(2) Date: Mar. 13, 2019

(87) PCT Pub. No.: WO2018/054587
PCT Pub. Date: Mar. 29, 2018

(65) Prior Publication Data
US 2019/0249775 A1    Aug. 15, 2019

(30) Foreign Application Priority Data
Sep. 21, 2016 (DE) .......................... 10 2016 117 833

(51) Int. Cl.
*F16K 17/18* (2006.01)
*F16J 13/24* (2006.01)
(Continued)

(52) U.S. Cl.
CPC ............ *F16J 13/24* (2013.01); *B65D 90/325* (2013.01); *B65D 90/34* (2013.01); *F16J 13/06* (2013.01);
(Continued)

(58) Field of Classification Search
CPC ... F16J 13/24; F16J 13/06; F16J 13/18; B65D 90/325; B65D 90/34; F16K 17/12
(Continued)

(56) References Cited

U.S. PATENT DOCUMENTS 3,995,435 A * 12/1976 Waterston ............... E02B 13/00
                                                              405/37
8,720,483 B2    5/2014 Thorwesten
(Continued)

FOREIGN PATENT DOCUMENTS

DE        36 26 946 A1    2/1988
DE        94 04 593 U1    5/1994
(Continued)

OTHER PUBLICATIONS

International Search Report in PCT/EP2017/069536, dated Oct. 17, 2017.

*Primary Examiner* — P. Macade Nichols
(74) *Attorney, Agent, or Firm* — Collard & Roe, P.C.

(57) ABSTRACT

Device (1) for closed systems for equalization of pressure surges, having an outlet nozzle (2), on which an impact plate (3) is provided and a hinged cover (4) is mounted pivotably, wherein the hinged cover (4) lies in a rest position (5) on the outlet nozzle (2) and in an open position (6) bears on the impact plate (3), wherein at least one holding-closed device (7) is provided, which presses the hinged cover (4) in the rest position (5) against the outlet nozzle (2) and in the case of a pressure surge releases the hinged cover (4), wherein the device has a control unit (8) that controls the holding-closed device (7).

10 Claims, 3 Drawing Sheets

Figure 1:
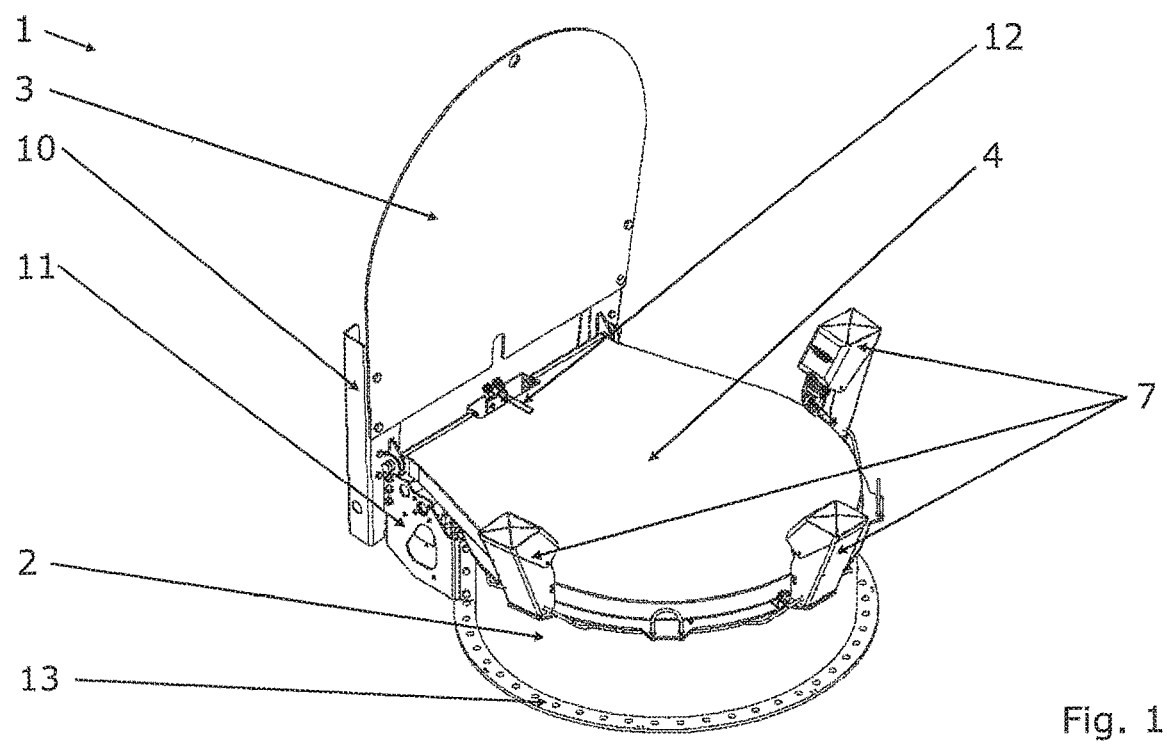

(51) Int. Cl.
*B65D 90/34* (2006.01)
*F16K 37/00* (2006.01)
*F16J 13/18* (2006.01)
*F16K 17/12* (2006.01)
*F16K 17/164* (2006.01)
*F16L 55/115* (2006.01)
*F16J 13/06* (2006.01)
*B65D 90/32* (2006.01)

(52) U.S. Cl.
CPC ............... *F16J 13/18* (2013.01); *F16K 17/12* (2013.01); *F16K 17/164* (2013.01); *F16K 37/0041* (2013.01); *F16L 55/1157* (2013.01)

(58) Field of Classification Search
USPC .............................................. 137/527, 527.6
See application file for complete search history.

(56) References Cited

U.S. PATENT DOCUMENTS

2002/0190068 A1\* 12/2002 Sisk ....................... B65D 90/10
220/263
2013/0264341 A1  10/2013 Cockerham et al.

FOREIGN PATENT DOCUMENTS

| DE | 20 2006 018244 U1 | 4/2008 |
| EP | 1 873 085 A1 | 1/2008 |
| EP | 2 084 088 B1 | 8/2009 |

\* cited by examiner

DEVICE FOR CLOSED SYSTEMS FOR EQUALIZING PRESSURE SURGES

CROSS REFERENCE TO RELATED APPLICATIONS

This application is the National Stage of PCT/EP2017/069536 filed on Aug. 2, 2017, which claims priority under 35 U.S.C. § 119 of German Application No. 10 2016 117 833.0 filed on Sep. 21, 2016, the disclosure of which is incorporated by reference. The international application under PCT article 21(2) was not published in English.

The invention relates to a device for closed systems for equalization of pressure surges, having an outlet nozzle, on which an impact plate is provided and a hinged cover is mounted pivotably, wherein the hinged cover lies in a rest position on the outlet nozzle or on the casing and in an open position bears on the impact plate, wherein at least one holding-closed device is provided, which presses the hinged cover in the rest position against the outlet nozzle and in the case of a pressure surge releases the hinged cover.

Such devices or explosion doors are used in closed systems, such as silos, pipelines, biogas systems or the like, in order to create a pressure equalization in the case of pressure surges due to possible dust or gas explosions. Hereby a destruction of the closed system as well as further property damage and personal injury can be prevented.

Such a device is known from Patent Application DE 36 26 946 A1 of the Applicant, wherein the holding-closed device is designed as a spring-driven closure element, which presses the hinged cover in the rest position against the outlet nozzle and releases it in the explosion situation. In the case of an explosion, the hinged cover must overcome the restoring force of the spring of the closure element in order to execute a pivoting movement and to permit a pressure equalization. After the impact of the hinged cover against the impact plate, this closes again and must overcome the restoring force of the spring of the closure element one further time, in order to close the outlet nozzle in airtight manner again.

It has proved to be very advantageous to lighten the weight of the hinged cover, in order to reduce the inertia of the hinged cover and to bring about a pressure equalization in the case of an explosion with minimum delay. In recent years, hinged covers that consist of a carbon-fiber and glass-fiber material and that have a high strength for a low dead weight have therefore become widely used. One such hinged cover is known, for example from Patent EP 2 084 088 B1 of the Applicant.

The dead weight of such hinged covers in the lightweight construction is not sufficient to overcome the restoring force of a closure element according to DE 36 26 946 A1 and to seal off the closed system once again in airtight manner. It is disadvantageous here that, for example, dirt or moisture is able to penetrate into the system and cause destruction of the bulk materials. However, it is particularly disadvantageous that, after an explosion in the closed system, a fire is able to begin, which becomes further supplied with oxygen because the device is not sealed off in airtight manner and leads to destruction of the system.

The task of the invention is therefore to specify a device of the type designated in the introduction, in which the hinged cover in lightweight construction seals off the system in airtight manner by lying on the outlet nozzle.

This task is accomplished according to the invention by a device of the type designated in the introduction and having the features of claim 1.

Thus a device for closed systems for equalization of pressure surges is made available that has a control unit that controls the holding-closed device. For this purpose, the control or regulation system is designed such that, in the case of an explosion, the holding-closed device releases the hinged cover and this is able to pivot from the rest position into the open position and in the process dissipate its kinetic energy by the impact on the impact plate. Then the hinged cover drops into the rest position, wherein the holding-closed device is still just opened at that instant, i.e. the space between the hinged cover and the outlet nozzle is clear, and so the hinged cover is able to lie on the outlet nozzle. After the hinged cover is lying on the outlet nozzle, the holding-closed device, in response to a signal of the control unit, presses on the hinged cover now in the rest position and thus seals of the system in airtight manner.

A further advantage is that the pressure that the holding-closed device exerts on the hinged cover can also be set variably, and thus may be adapted on the spot in the simplest way to the requirements. Furthermore, the response pressure, i.e. the pressure that the hinged cover must exert on the holding-closed device in order to achieve clearance of the space between the hinged cover and the outlet nozzle can also be set variably.

Further configurations of the invention will become apparent from the dependent claims. In this connection, it is expedient that at least one sensor, e.g. a roller pushbutton, is provided that registers the position of the hinged cover and communicates it to the control unit. Such a sensor may use mechanical, piezoelectric, capacitive, inductive, optical, resistive or magnetic effects for measurement of the position of the hinged cover. Thus, for example, the sensor may even be a roller pushbutton. In this context, the position of the hinged cover is to be understood as that position between the rest position or open position into which the hinged cover may be pivoted. It is then particularly important that the sensor determines whether the hinged cover is in the rest position. It is advantageous for such a sensor that the control unit or the holding-closed device is able to react not only in time-controlled but also in event-based manner.

In a further configuration, it is provided that the holding-closed device is pneumatically adjustable, so that particularly high working speeds are achieved and the time that elapses until the holding-closed device clears the hinged cover is reduced to a minimum. In comparison with an electrical holding-closed device, a pneumatic holding-closed device is simpler in construction and has a lighter dead weight. A further advantage of the pneumatic holding-closed device is that, at the outlet nozzle, from which potentially an explosive air-gas mixture may still escape, this is not ignited by the waste heat of the holding-closed device, since the waste heat in pneumatic systems is developed mainly at the compressor itself. Compared with hydraulic systems, the advantage exists that no return lines are needed, since the exhaust air produced is able to escape directly into the environment and thus the working speed of the holding-closed device is increased.

The control unit itself may be designed pneumatically or even electropneumatically by use of electronic circuits, such as programmable logic controllers.

Furthermore, a compressed-air accumulator is provided as an energy store or buffer, which supplies the holding-closed device with compressed air in the event of current failure. The compressed-air accumulator is in communication with a compressed-air supply, and it stores compressed air for the holding-closed device. In the case of a failure of the compressed-air supply, the compressed-air accumulator serves as an emergency store, which ensures a flawless function of the holding-closed device. The compressed-air accumulator itself is equipped with a pressure-operated switch, which can be read at a control station of a remote-maintenance system and is used for the checking of the pressure present at the compressed-air accumulator.

A further configuration provides that the holding-closed device has a pneumatic cylinder having a movable piston. Pneumatic cylinders are common standard structural parts and can be manufactured inexpensively and simply, wherein they have the further advantage that the pressure of the holding-closed device on the hinged cover may also be controlled or regulated by the change of the air pressure that is present.

It is preferred that the pneumatic cylinder be mounted pivotably around an axle with one end in a housing of the holding-closed device. The pivotable bearing system of the pneumatic cylinder permits an improvement of the working speed or reaction time of the holding-closed device. This cylinder, including the piston, will be pivoted completely out of the region of movement of the hinged cover due to venting of the interior space of the piston in the case of an explosion.

In a further particular configuration, it is provided that an interlocking lever is linked pivotably at the free end of the piston and that these together form an articulated joint. The pivotably mounted interlocking lever offers the advantage that the force of the piston is transferred optimally to the hinged cover.

Furthermore, it is provided particularly preferably that one end of the interlocking lever is mounted pivotably around a lever axle, wherein the lever axle is mounted in the housing. This has the advantage that the interlocking lever, after an explosion, does not extend accidentally into the space between the hinged cover and the outlet nozzle and consequently prevent an airtight sealing-off of the system.

A further special configuration provides that the interlocking lever has a recess for the transition of the rim of the hinged cover, so that the force of the piston acts parallel to the extension of the axis of symmetry of the outlet nozzle and thereby an optimum pressure of the hinged cover on the outlet nozzle takes place at a given force of the piston.

Furthermore, it is particularly preferred that the holding-closed device has a fast-venting means. Hereby an improvement of the working speed or reaction time of the holding-closed device may be achieved, since, in the case of an explosion, the inner space of the piston can be vented very rapidly, in order to retract the interlocking lever, so that the hinged cover is able to strike against the impact plate.

A particularly preferred configuration provides that the control unit controls the holding-closed device in such a way that it presses the hinged cover onto the outlet nozzle only after a predefined time interval following a pressure surge. In the case of a dust or gas explosion, it is possible that several explosions will occur one after the other and the hinged cover should be pressed onto the outlet nozzle once again only when an equilibrium state has been established in the system. This time interval may be defined simply via the control unit.

Figure 2:
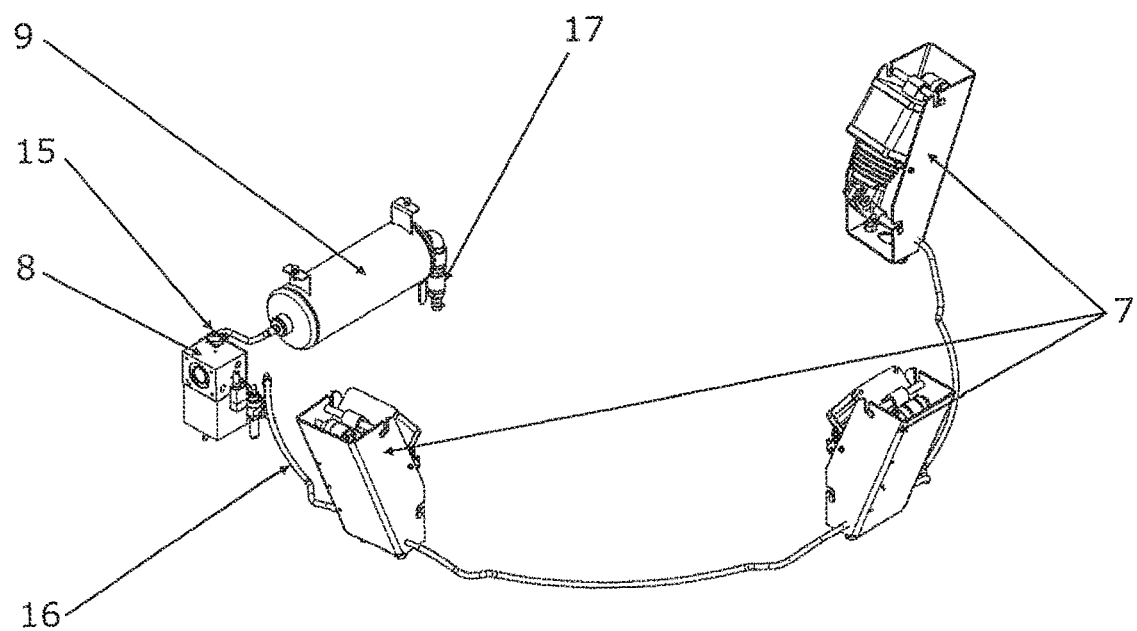
Figure 3:
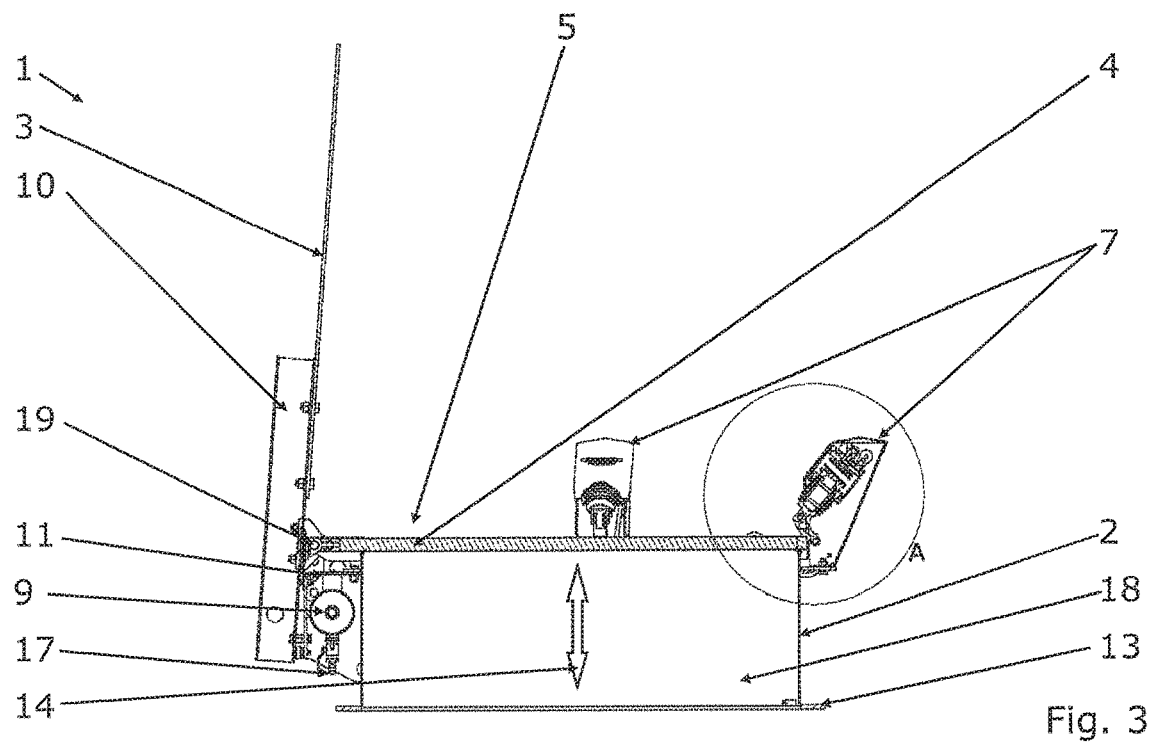
Figure 4:
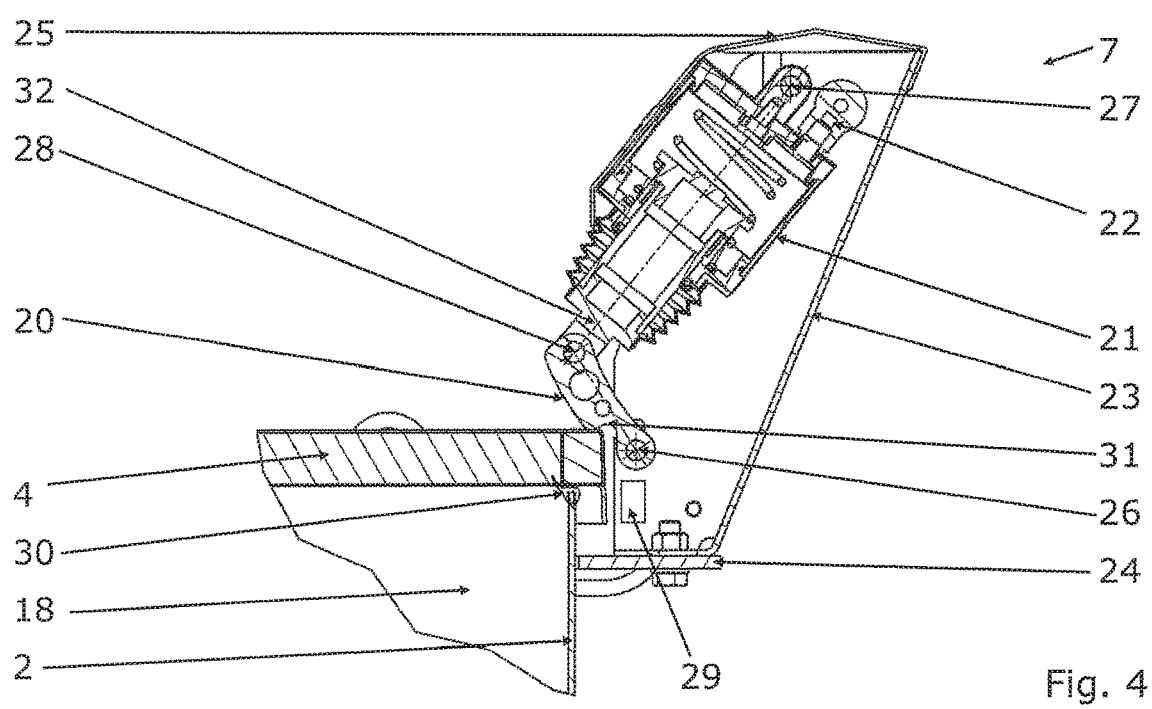
Figure 5:
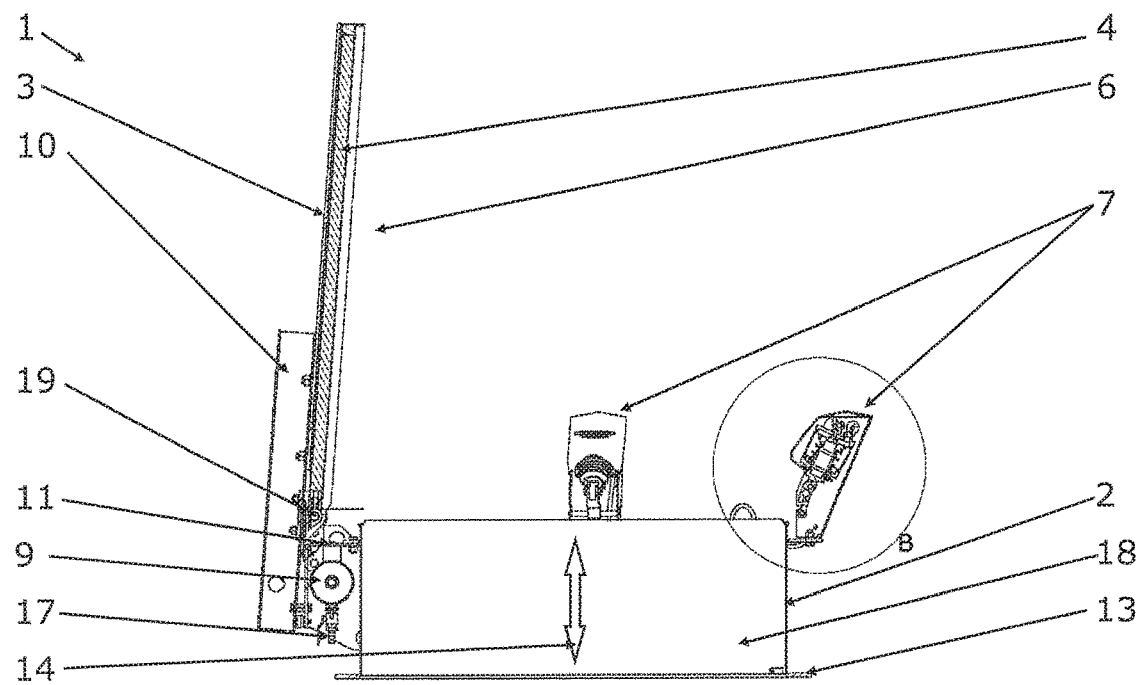
Figure 6:
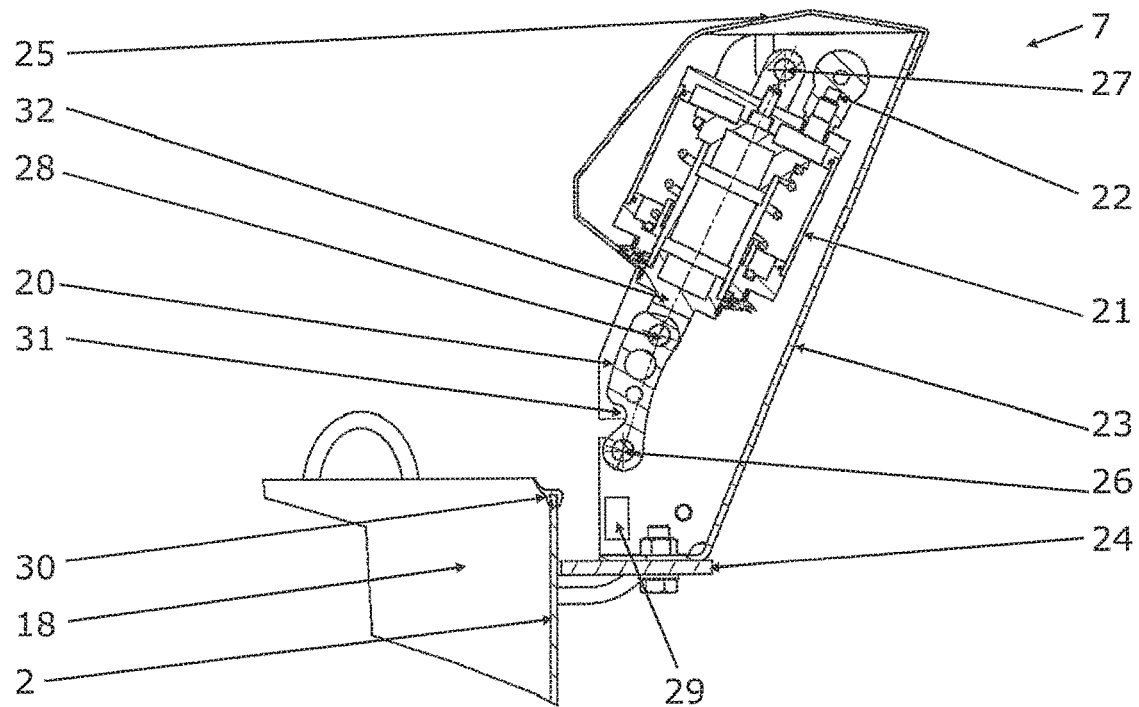

Further features, details and advantages of the invention will become apparent on the basis of the following description hereinafter as well as on the basis of the drawings. Items or elements corresponding to one another are denoted by the same reference symbol in all figures, wherein FIG. 1 shows a perspective view of a device according to the invention, FIG. 2 shows a perspective view of the pneumatic structure of the device from FIG. 1, FIG. 3 shows a cross-sectional diagram of a device according to the invention, wherein the hinged cover is in the rest position, FIG. 4 shows a cross-sectional diagram of a holding-closed according to the invention, wherein the hinged cover is in the rest position, FIG. 5 shows a cross-sectional diagram of a device according to the invention, wherein the hinged cover is in the open position, FIG. 6 shows a cross-sectional diagram of a holding-closed device according to the invention, wherein the hinged cover is in the open position.

In FIG. 1, a perspective view of a device 1 according to the invention is illustrated, which has an outlet nozzle 2, which preferably is designed as a cylindrical tube, wherein a flange 13, which is formed as a circumferential annular broadening of the outlet nozzle 2 and has a large number of bores, is provided at one end of the outlet nozzle 2. The device 1 is mounted detachably with the flange 13 on an opening of a system, not illustrated, for example a container or a silo. This opening has a diameter that is not larger than the diameter of the outlet nozzle 2.

At the end of the outlet nozzle 2 situated opposite the flange 13, a pivotable hinged cover 4, an impact plate 3 and at least one holding-closed device 7 are provided. As an example, three holding-closed devices 7 are provided in this embodiment, wherein the number of holding-closed devices 7 depends on the diameter of the outlet nozzle 2.

Transverse to a longitudinal extent or axis of symmetry 14, two frame elements 11, on which respectively one profile 10 is detachably mounted that is aligned substantially parallel to the longitudinal extent or axis of symmetry 14 of the outlet nozzle 2, are disposed spaced apart from one another on the outside of the outlet nozzle 2. The impact plate 3 is detachably disposed on the profiles 10, and thus is rigidly joined to the outlet nozzle 2 via the frame elements 11.

The hinged cover 4 is mounted pivotably in the profiles 10 and in this diagram is in a rest position 5. In this rest position 5, the hinged cover 4 lies on the end of the outlet nozzle 2 that is situated opposite the flange 13, and is pressed by the holding closed devices 7 against the outlet nozzle 2, in order to seal off the system, not illustrated, in airtight manner. In the case of an explosion in the system, not illustrated, the hinged cover 4 is blown open by the resulting pressure surge, wherein the holding-closed devices 7 release the hinged cover 4 and this is able to pivot around a pivot axle 19 into an open position 6 and thus strike the impact plate 3. Hereby the kinetic energy of the hinged cover 4 is transferred to the impact plate 3 and thus a destruction of the hinged cover 4 is prevented.

The situation may occur that the hinged cover 4 gives up its kinetic energy completely to the impact plate 3 and sticks in undesired manner in the open position 6. In order to prevent this, a restoring spring 12, which in such a situation moves the hinged cover 4 in the direction of the outlet nozzle 2, is disposed around the pivot axle 19 of the hinged cover 4. The restoring spring 12 is also advantageous in installation situations in which the device 1 is installed in a position inclined to the horizontal.

In FIG. 2, a perspective view is shown of the pneumatic structure of the device from FIG. 1. This pneumatic structure has a compressed-air accumulator 9 as energy store or buffer, a control unit 8 and at least one holding-closed device 7, which are in communication with lines 16. Via the line 16, the control unit 8 as well as the holding-closed device 7 is supplied with compressed air. A compressed-air port 17, which is in communication with a compressed-air system, not illustrated, is disposed on the compressed-air accumulator 9. Furthermore, a sensor 15, which in this embodiment is designed as a roller pushbutton, is connected to the control unit 8 and communicates the position of the hinged cover 4 to the control unit 8.

The active interlocking of the hinged cover 4 controls or regulates the control unit 8, which preferably is of pneumatic design. If the hinged cover 4 drops back into its rest position 5 after an explosion, the sensor 15 is activated and communicates a signal to the control unit 8, whereby the holding-closed device 7 is pressurized in time-delayed manner with compressed air, which is transported via the lines 16, and actively presses the hinged cover 4 onto the outlet nozzle 2 and thus seals off the system in airtight manner. In this connection, the time delay is set to a desired value and is controlled by a timing valve, not illustrated. Furthermore, the control unit 8 is provided with the following components, not illustrated: A vent valve, a pressure regulator, a pressure-measuring transducer (4-20 mA) and a safety valve for limitation of the maximum pressure.

In FIG. 3, a cross-sectional diagram is shown of a device according to the invention, wherein the hinged cover is in the rest position 5.

In FIG. 4, the detail A from FIG. 3 is illustrated in enlarged manner, and it shows a cross-sectional diagram of a holding-closed device according to the invention in a blocking position. The outlet nozzle 2 bounds an internal volume 18, which in the exemplary embodiment is empty, although it is also conceivable that a flame-arresting element, which is formed from a honeycomb structure, for example, is contained in the internal volume 18. The axis of symmetry 14 extends substantially parallel to the axial direction of the outlet nozzle 2.

The holding-closed device 7 has a housing 23, which is joined by a connecting profile 24 to the outlet nozzle 2 and has a weather-protection hood 25. A pneumatic cylinder 21, which is mounted pivotably around an axle 27, is disposed inside the housing 23. The pneumatic cylinder 21 has a piston 32, which executes a translation movement away from the pneumatic cylinder 21 as soon as the holding-closed device 7 and consequently also the pneumatic cylinder 21 is pressurized with compressed air. For this purpose, the pneumatic cylinder 21 is in communication via lines, not illustrated, with the compressed-air accumulator 9 and/or with the control unit 8. If the pressurization of the pneumatic cylinder 21 with compressed air is canceled, a restoring spring inside the pneumatic cylinder 21 ensures that the piston 32 is drawn into the interior of the pneumatic cylinder 21.

At the free end of the piston 32, i.e. at the end that is not enclosed in the pneumatic cylinder 21, one end of an interlocking lever 20 is mounted pivotably and forms an articulated joint 28 together with the piston 32. Another end of the interlocking lever 20 is mounted pivotably around the lever axle 26. The axle 27 and the lever axle 26 are formed by round profiles, which in FIGS. 4 and 6 extend substantially parallel to the normals to the surface of the drawing plane. These round profiles are connected detachably to the housing 23 and permit merely a rotation of the pneumatic cylinder 21 or of the interlocking lever 20 around the respective axle. Due to the rim conditions, a combination of a rotation and translation movement is possible only by a translation movement of the piston 32.

The interlocking lever 20 has a recess 31 at the transition of the rim of the hinged cover 4 and thus makes it possible for the force that acts on the hinged cover 4 to be oriented substantially parallel to the axis of symmetry 14. Hereby the seal 30 between the outlet nozzle 2 and the hinged cover 4 is deformed elastically in such a way that the system, not illustrated, is sealed off in airtight manner with the device.

Until the establishment of a set static response pressure, which is variably adjustable with the control unit 8, the hinged cover 4 is held in the rest position 5 by the interlocking lever lying on it. If the pressure in the system exceeds the response pressure, the pneumatic cylinder 21 is vented suddenly via a fast-venting means 22, so that the piston 32 is drawn into the pneumatic cylinder 21 by the restoring spring built into the pneumatic cylinder 21, wherein hereby the interlocking lever 20 changes over from a blocking position to a releasing position and releases the hinged cover 4, so that this is able to pivot toward the impact plate 3.

In FIG. 5, a cross-sectional diagram is shown of a device according to the invention, wherein the hinged cover is in the open position 6. In FIG. 6, the detail B from FIG. 5 is illustrated in enlarged manner, and it shows a cross-sectional diagram of a holding-closed device according to the invention in a releasing position. By means of an additional sensor 29, which is preferably disposed underneath the interlocking lever 20, the position of the hinged cover 4 may be determined in a control station of a remote-maintenance system.

Naturally the invention is not limited to the illustrated exemplary embodiments. Further configurations are possible without departing from the basic ideas. Thus the device may also be equipped with underpressure doors, in order to prevent an implosion of the system. Furthermore, it may be practical for the hinged cover to be equipped with temperature sensors and an electric heating system. In this respect, it is advantageous that the hinged cover can be kept free of snow loads and ice formation. Since the control unit and the holding-closed device are of completely pneumatic design and also a compressed-air accumulator is provided as energy store or buffer, the correct function of the device according to the invention is always still ensured in the case of a current failure, since it is independent of the voltage supply. Furthermore, it must be kept in mind that an active pressing closed is always meant by pressing closed.

LIST OF REFERENCE SYMBOLS

1 Device
2 Outlet nozzle
3 impact plate
4 Hinged cover
5 Rest position
6 Open position
7 Holding-closed device
8 Control unit
9 Compressed-air accumulator
10 Profile
11 Frame element
12 Restoring spring
13 Flange
14 Axis of symmetry
15 Roller pushbutton
16 Line
17 Compressed-air port
18 Internal volume
19 Pivot axis
20 Interlocking lever
21 Pneumatic cylinder
22 Fast-venting means 23 Housing
24 Connecting profile
25 Weather-protection hood
26 Lever axle
27 Axle
28 Articulated joint
29 Sensor
30 Seal
31 Recess
32 Piston

The invention claimed is:

1. A device for closed systems for equalization of pressure surges, having an outlet nozzle, on which an impact plate is provided and a hinged cover is mounted pivotably, wherein the hinged cover lies in a rest position on the outlet nozzle and in an open position bears on the impact plate, wherein at least one holding-closed device is provided, which presses the hinged cover in the rest position against the outlet nozzle and in the case of a pressure surge releases the hinged cover,
wherein the device has a control unit that controls the holding-closed device and
wherein the holding-closed device is pneumatically adjustable.

2. The device according to claim 1, wherein at least one sensor is provided that registers the position of the hinged cover and communicates it to the control unit.

3. The device according to claim 1, wherein a compressed-air accumulator is provided as an energy store or buffer, which supplies the holding-closed device with compressed air.

4. The device according to claim 1, wherein the holding-closed device has a pneumatic cylinder having a movable piston.

5. The device according to claim 4, wherein the pneumatic cylinder is mounted pivotably around an axle with one end in a housing of the holding-closed device.

6. The device according to claim 4, wherein an interlocking lever is linked pivotably at the free end of the piston and these together form an articulated joint.

7. The device according to claim 6, wherein one end of the interlocking lever is mounted pivotably around a lever axle, wherein the lever axle is mounted in the housing.

8. The device according to claim 6, wherein the interlocking lever has a recess at the transition of the rim of the hinged cover.

9. The device according to claim 1, wherein the holding-closed device has a fast-venting means.

10. The device according to claim 1, wherein the control unit controls the holding-closed device in such a way that the holding-closed device presses the hinged cover onto the outlet nozzle only after a predefined time interval following a pressure surge.

* * * * *